United States Patent
Uenuma et al.

(10) Patent No.: US 6,751,539 B2
(45) Date of Patent: Jun. 15, 2004

(54) VEHICLE STEERING CONTROL SYSTEM

(75) Inventors: Kenya Uenuma, Kanagawa (JP); Hiroshi Mouri, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/241,781

(22) Filed: Sep. 12, 2002

(65) Prior Publication Data

US 2003/0055545 A1 Mar. 20, 2003

(30) Foreign Application Priority Data

Sep. 17, 2001 (JP) ........................................ 2001-281362

(51) Int. Cl.⁷ .............................................. B62D 6/02
(52) U.S. Cl. ............................. 701/41; 701/42; 701/44; 180/402; 180/443; 180/446; 340/465
(58) Field of Search ............................ 701/41, 42, 44; 340/465; 180/402, 443, 446

(56) References Cited

U.S. PATENT DOCUMENTS

| | | | | |
|---|---|---|---|---|
| 5,406,474 A | * | 4/1995 | Hansen | 700/37 |
| 5,908,457 A | * | 6/1999 | Higashira et al. | 701/41 |
| 6,097,286 A | * | 8/2000 | Discenzo | 340/465 |
| 6,176,341 B1 | * | 1/2001 | Ansari | 180/402 |
| 6,219,604 B1 | * | 4/2001 | Dilger et al. | 701/41 |
| 6,505,703 B2 | * | 1/2003 | Stout et al. | 180/446 |

FOREIGN PATENT DOCUMENTS

| | | |
|---|---|---|
| JP | 11-078947 | 3/1999 |
| JP | 2000-128002 | 5/2000 |

* cited by examiner

*Primary Examiner*—William A. Cuchlinski, Jr.
*Assistant Examiner*—Eric M. Gibson
(74) *Attorney, Agent, or Firm*—Foley & Lardner LLP

(57) ABSTRACT

In a steering mechanism of steer-by-wire type which includes a first steering unit that is handled by a driver and a second steering unit that steers steered road wheels with the aid of a steering motor, there is employed a control system which input and output detecting sections that detect input and output of the steering motor, a road surface disturbance estimating section that estimates a disturbance of road surface based on both the detected input and output of the steering motor, and a steering reaction force calculating section that, based on the estimated disturbance of road surface, calculates a steering reaction force that is to be applied to a steering wheel of the first steering unit.

9 Claims, 4 Drawing Sheets

VEHICLE STEERING CONTROL SYSTEM

BACKGROUND OF INVENTION

1. Field of Invention

The present invention relates to vehicle steering control systems, and more particular, to the systems of a so-called "steer-by-wire type" wherein a first steering unit that is handled by a driver and a second steering unit that steers steered road wheels are not connected through a linkage mechanism, that is, the steered road wheels are steered by a powered actuator in accordance with an information signal issued from a sensor associated with a steering wheel.

2. Description of Related Art

One steering control system of the steer-by-wire type is shown in Japanese Laid-open Patent Application (Tokkaihei) 11-78947. In this system, for steering the steered road wheels, there are employed an electric motor that produces a power to steer the steered road wheels, sensing devices that sense an angle of rotation of the steering wheel and a steering torque of the same and a steering reaction force generating device that imparts a steering resistance to the operational force of the steering wheel.

In general, when driving a motor vehicle, a driver has to handle various control devices suitably in accordance with the existing conditions of and around the vehicle with the aid of tactile information as well as visual information. Particularly, when handling a steering wheel, a steering reaction force (viz., a counterforce felt by the driver through the steering wheel when he or she turns the steering wheel) constitutes an important information that reliably represents a road surface condition and a vehicle running condition.

In a steering device of known linkage type wherein the steering wheel (namely, first steering unit) is connected to the steered road wheels (namely, second steering unit) through a linkage mechanism, the steering reaction force is passively transmitted to the driver through the linkage mechanism. While, in a steering mechanism of steer-by-wire type wherein there is no linkage mechanism between the steering wheel and the steered road wheels, it is necessary to provide a device that positively provides the steering wheel with a suitable steering reaction force.

When, like in corner turnings, a motor vehicle shows a relatively marked behavior, the steering reaction force is readily derived or calculated by using information signals issued from a yaw rate sensor and a lateral acceleration sensor that are mounted on the vehicle. However, regarding information on a roughness degree of road surface, it is very difficult to derive or calculate the steering reaction force because the behavior of the motor vehicle caused by such roughness of road surface is quite small.

In the steering control system of the above-mentioned publication 11-78947, a torque sensor is mounted on the second steering unit to directly derive or calculate a disturbance originating from the road surface. The arrangement of the torque sensor proposed by this publication however tends to reduce the rigidity of the second steering unit because of the nature of the actually employed torque sensor. That is, usage of the torque sensor means that a shaft portion of the second steering unit has a diametrically reduced part which is subjected to a torsional movement when applied with a certain torque. The diametrically reduced part causes the reduced rigidity of the second steering unit. In view of this, Japanese Laid-open Patent Application (Tokkai) 2000-128002 proposes usage of a position sensor which senses a stroke position of a rack shaft of the second steering unit. In this case, the position sensor mounted on the second steering unit has no influence on the rigidity of the second steering unit. Based on an information signal from the position sensor, a linear approximate equation is used for calculating the steering reaction force. However, even in this measure, satisfied calculation of the steering reaction force has not been carried out because of contradiction of usage of such "linear" equation in the field of steering system which has "nonlinear" characteristics.

SUMMARY OF INVENTION

It is therefore an object of the present invention to provide a vehicle steering control system which, without the aid of an additional sensor, can provide an accurate information on a roughness degree of road surface even when the roughness degree is small to such a degree as not induce a marked behavior of the associated motor vehicle.

According to a first aspect of the present invention, there is provided a vehicle steering control system for use with a steering mechanism of steer-by-wire type, the steering mechanism including a first steering unit that is handed by a driver and a second steering unit that steers steered road wheels with the aid of a steering actuator, the first and second steering units being mechanically unconnected, the vehicle steering control system comprising a steering reaction force actuator that generates a steering reaction force that is to be applied to the first steering unit in accordance with a steered movement of the steered road wheels; an input detecting section that detects an input applied to the steering actuator; an output detecting section that detects an output issued from the steering actuator; a road surface disturbance estimating section that estimates a disturbance of road surface based on both the detected input and output of the steering actuator; a steering reaction force calculating section that, based on the estimated disturbance of road surface, calculates a steering reaction force which is to be applied to the first steering unit; and a steering reaction force control section that instructs the steering reaction force actuator to generate a steering reaction force in accordance with the calculated steering reaction force.

According to a second aspect of the present invention, there is provided a vehicle steering control system for use with a steering mechanism of steer-by-wire type, the steering mechanism including a first steering unit that is handed by a driver and a second steering unit that steers steered road wheels with the aid of a steering actuator, the first and second steering units being mechanically unconnected, the vehicle steering control system comprising: a steering reaction force generating means that generates a steering reaction force that is to be applied to the first steering unit in accordance with a steered movement of the steered road wheels; an input detecting means that detects an input applied to the steering actuator; an output detecting means that detects an output issued from the steering actuator; a road surface disturbance estimating means that estimates a disturbance of road surface based on both the detected input and output of the steering actuator; a steering reaction force calculating means that, based on the estimated disturbance of road surface, calculates a steering reaction force which is to be applied to the first steering unit; and a steering reaction force control means that instructs the steering reaction force actuator to generate a steering reaction force in accordance with the calculated steering reaction force.

According to a third aspect of the present invention, there is provided a method of controlling a vehicle steering control system for use with a steering mechanism of steer-by-wire type, the steering mechanism including a first steering unit that is handed by a driver and a second steering unit that steers steered road wheels without a direct aid of the first steering unit, a steering actuator that actuates the second steering unit and a steering reaction force actuator that applies a steering reaction force to the first steering unit in accordance with a steered movement of the steered road wheels, the method comprising detecting an input applied to the steering actuator; detecting an output issued from the steering actuator; estimating a disturbance of road surface based on both the detected input and output of the steering actuator; calculating, based on the estimated disturbance of road surface, a steering reaction force which is to be applied to the first steering unit; and instructing the steering reaction force actuator to generate a steering reaction force in accordance with the calculated steering reaction force.

DETAILED DESCRIPTION OF EMBODIMENTS

Figure 1:
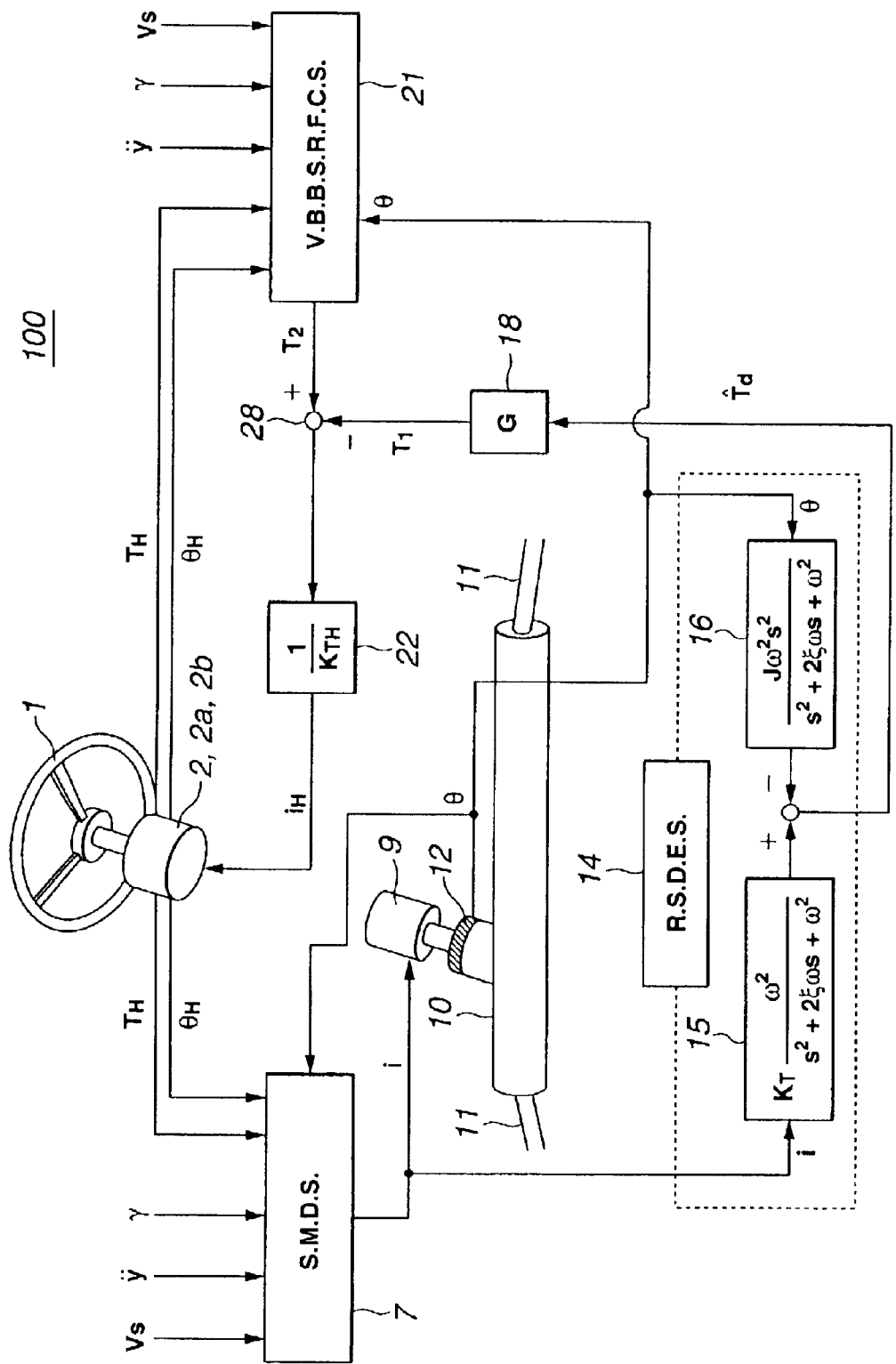
FIG. 1 is a schematic diagram of an overall structure of a vehicle steering control system of a first embodiment of the present invention.

Referring to FIG. 1, there is schematically shown a vehicle steering control system 100 of a first embodiment of the present invention, which is practically applied to a front wheel steering system installed in a motor vehicle.

In the drawing, denoted by numeral 1 is a steering wheel, 2 is a steering reaction force actuator, 7 is a steering motor drive section, 9 is a steering motor, 10 is a steering gear unit, 11a and 11b are tie rods, 12 is an encoder, 14 is a road surface disturbance estimation section, 18 is a road surface disturbance based steering reaction force calculating section (or a second steering reaction force calculating section), 21 is a vehicle behavior based steering reaction force calculating section (or a first steering reaction force calculating section), 22 is an instruction current calculating section and 28 is a final steering reaction force calculating section.

The steering wheel 1 is a device that is handled by a driver. That is, when steering wheel 1 is handed by the driver, a torque sensor 2a installed in steering reaction force actuator 2 detects a steering torque "TH" and at the same time, an encoder 2b in the actuator 2 detects a steering angle "θH" by which steering wheel 1 has been steered by the driver.

Into steering motor drive section 7, there are inputted, in addition to information signals on the above-mentioned steering torque "TH" and steering angle "θH", information signals on a yaw rate "y" of the vehicle detected by a yaw rate gyro or the like, a lateral acceleration "ÿ" of the vehicle detected by a lateral acceleration sensor or the like, and other known information such as a vehicle speed "Vs" and the like. Based on these information signals inputted, steering motor drive section 7 calculates an instruction current "i" which is applied to steering motor 9. As shown, the instruction current "i" is applied to road surface disturbance estimation section 14 also.

Output rotation of steering motor 9 is transmitted to steering gear unit 10, which is of a rack-and-pinion type, and thus, steered road wheels (not shown) are actuated by steering gear unit 10 through tie rods 11a and 11b.

The encoder 12 is arranged concentric with an output shaft of steering motor 9 to monitor or detect a rotation angle "θ" of the output shaft of steering motor 9. An information signal on rotation angle "θ" is fed back to steering motor drive section 7 to force the section 7 to carry out a servo control on the steered angle. The information signal on the rotation angle "θ" is fed to road surface disturbance estimation section 14 also.

That is, into road surface disturbance estimation section 14, there are inputted the information signal on the instruction current "i" applied to the steering motor 9 and that on the rotation angle "θ" of the output shaft of steering motor 9. Based on these information signals "i" and "θ", the road surface disturbance estimation section 14 calculates an estimated disturbance torque "T̂d" which would be caused by disturbance of road surface. The road surface disturbance estimation section 14 comprises generally a first block 15 into which the information signal "i" is inputted and a second block 16 into which the information signal "θ" is inputted.

As will be described hereinafter, by first block 15, a torque "$t_1$" that should be generated is estimated. For this estimation, the following equation is employed:

$$t_1 = K_T \frac{\omega^2}{s^2 + 2\xi\omega s + \omega^2} \quad (1)$$

While, by second block 16, a torque "$t_2$" that should be instructed is estimated. For this estimation, the following equation is employed:

$$t_2 = \frac{J\omega^2 s^2}{s^2 + 2\xi\omega s + \omega^2} \quad (2)$$

Into the second steering reaction force calculating section 21, there are inputted information signals on a vehicle running condition, that is, on steering torque "TH", steering angle "θH", yaw rate "y" of the vehicle, lateral acceleration "ÿ" of the vehicle, vehicle speed "Vs" and rotation angle "θ". Based on these information signals, the second steering reaction force calculating section 21 calculates a steering reaction force "$T_2$" which would be transmitted to the driver through the steering wheel 1.

In the second steering reaction force calculating section 18, a suitable gain is applied to the estimated disturbance torque "T̂d" to calculate a steering reaction force "$T_1$" which would be caused by the disturbance of road surface.

In the final steering reaction force calculating section 28, a subtraction "$T_2-T_1$" is carried out to obtain a final steering reaction force ($T_2-T_1$).

In the instruction current calculating section 22, the final steering reaction force ($T_2-T_1$) is divided by a torque constant "KTH" of steering reaction force actuator 2 to obtain an instruction current "iH" which is fed to the actuator 2.

In the following, operation of the vehicle steering control system 100 will be described with the aid of FIGS. 2, 3 and 4.

Estimation of Torque caused by Disturbance

Figure 2:
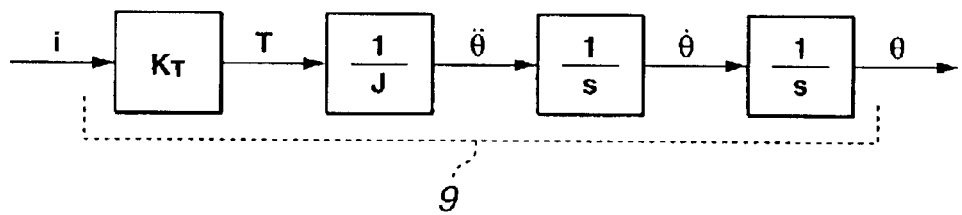
FIG. 2 is a block diagram of a steering motor employed in the first embodiment, under a normal condition.

FIG. 2 is a block diagram schematically showing the steering motor 9 based on an equation of motion of the motor 9. As shown, by multiplying the instruction current "i" by a torque constant "KT", a torque "T" is obtained, and by dividing the torque "T" by an inertia "J" of motor 9, a rotation speed "θ̇" of motor 9 is obtained. By differentiating the rotation speed "θ̇" by time twice, a rotation angle "θ" of the output shaft of the motor 9 is obtained.

Figure 3:
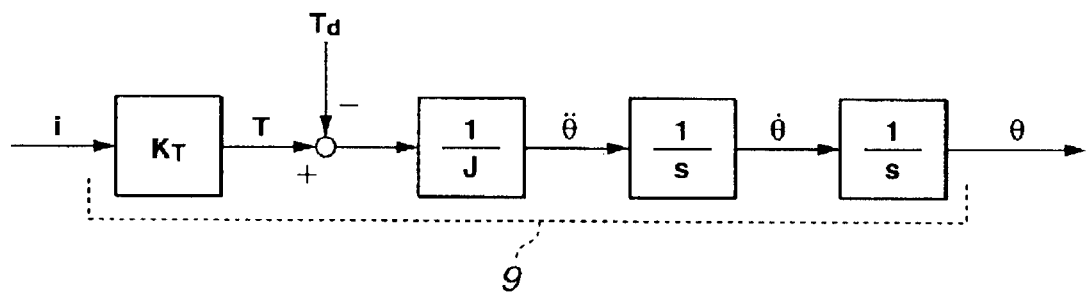
FIG. 3 is a block diagram of the steering motor employed in the first embodiment, under a condition wherein a certain disturbance originating from a roughness of road surface is applied to the steering motor.

In case wherein there is a disturbance of road surface, the steering motor 9 can be schematically shown by FIG. 3 in which a disturbance torque "Td" is led to a middle of the block diagram of FIG. 2. Due to presence of the disturbance torque "Td", it tends to occur that steering motor 9 exhibits excess or deficiency of output upon receiving the instruction current "i". In general, in controlling steering motor 9, instruction and output of the motor 9 are evenly carried out by feeding back the rotation angle "θ" to the control.

Figure 4:
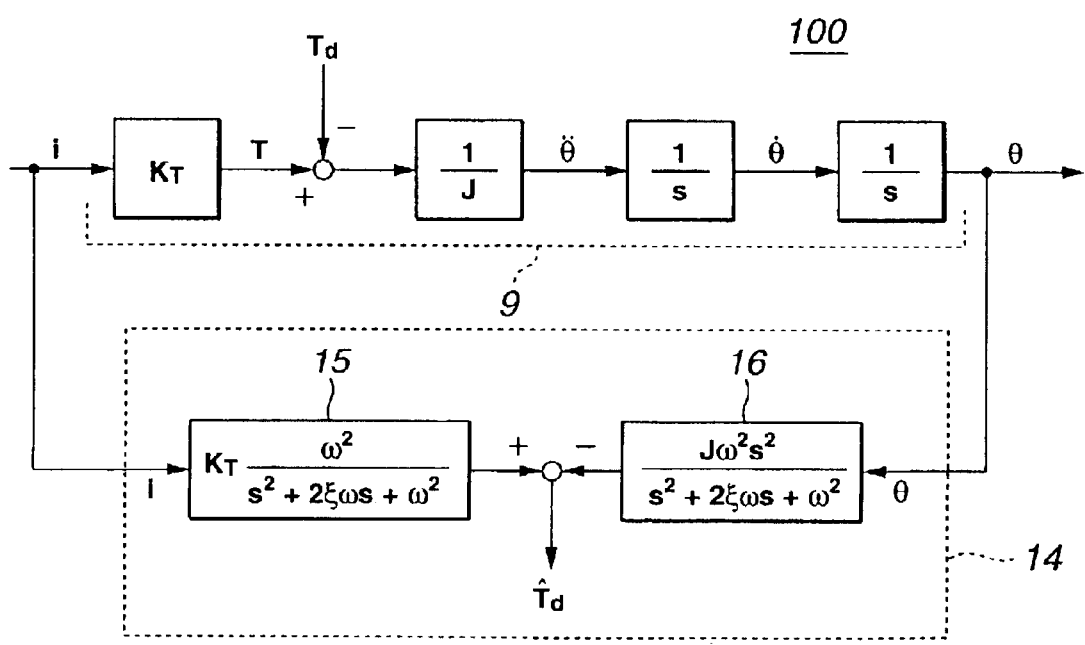
FIG. 4 is a block diagram showing the concept of the first embodiment of the present invention.

FIG. 4 is a block diagram showing both steering motor 9 and road surface disturbance estimation section 14. As will be described in the following, in this case, by treating both the information on instruction current "i" and the information on the rotation angle "θ", the disturbance torque "Td" is estimated. That is, the instruction current "i" led to steering motor 9 is fed to the first block 15. With this, the first block 15 estimates a torque "$t_1$" in the form of transfer function, that should be generated. While, the information on rotation angle "θ" is led to the second block 16. With this, the second block 16 estimates a torque "$t_2$" that would be instructed. By calculating a difference between the generated torque and the instructed torque, the estimated disturbance torque "T̂d" is obtained.

Steering Reaction Force to be Added

During cruising of the vehicle, in the first steering reaction force calculating section 18 (see FIG. 1), a suitable gain "G" is kept applied to the estimated disturbance torque "T̂d" to calculate a steering reaction force "$T_1$" which would be caused by a disturbance of road surface. While, in the second steering reaction force calculating section 22, a steering reaction force "$T_2$" is calculated based on the vehicle running condition. And at the final steering reaction force calculating section 28, a subtraction "$T_2-T_1$" is carried out to obtain a final steering reaction force $(T_2-T_1)$. In the instruction current calculating section 22, the final steering reaction force $(T_2-T_1)$ is divided by a torque constant "KTH" of steering reaction force actuator 2 to obtain an instruction current "iH" which is fed to the actuator 2.

In the following, advantageous matters obtained by the above-mentioned first embodiment 100 will be described.

Based on the input and output of the steering motor 9, the disturbance torque "Td" caused by a disturbance of road surface is estimated, and based on the estimated disturbance torque "Td", the steering reaction force "$T_1$" that is to be applied to the steering wheel 1 is calculated. Thus, information on roughness of road surface, that is of a degree of failing to induce a marked behavior of an associated motor vehicle, can be precisely transmitted to a driver without usage of an additional road surface sensor. That is, in the first embodiment 100, the estimation of disturbance of road surface is made by only the encoder 12 that is needed for controlling the steering motor 9. Accordingly, lowering in rigidity and that in reliability of the vehicle steering control system can be avoided.

The steering reaction force calculating part of the system 100 comprises the first steering reaction force calculating section 18 that, based on the estimated disturbance torque "T̂d" from road surface disturbance estimation section 14, calculates the steering reaction force "$T_1$" which would be caused by the disturbance of road surface, the second steering reaction force calculating section 21 that, based on various information on a marked behavior of the vehicle, calculates the steering reaction force "$T_2$" which should be transmitted to the driver and the final steering reaction force calculating section 28 that, based on both the calculated two reaction forces "$T_1$" and "$T_2$", calculates the final steering reaction force $(T_2-T_1)$. That is, the final steering reaction force $(T_2-T_1)$ thus calculated reflects both a reaction force based on the marked behavior of the vehicle and that based on the road surface disturbance "Td", and thus, a precise steering reaction force can be transmitted to the driver.

Figure 5:
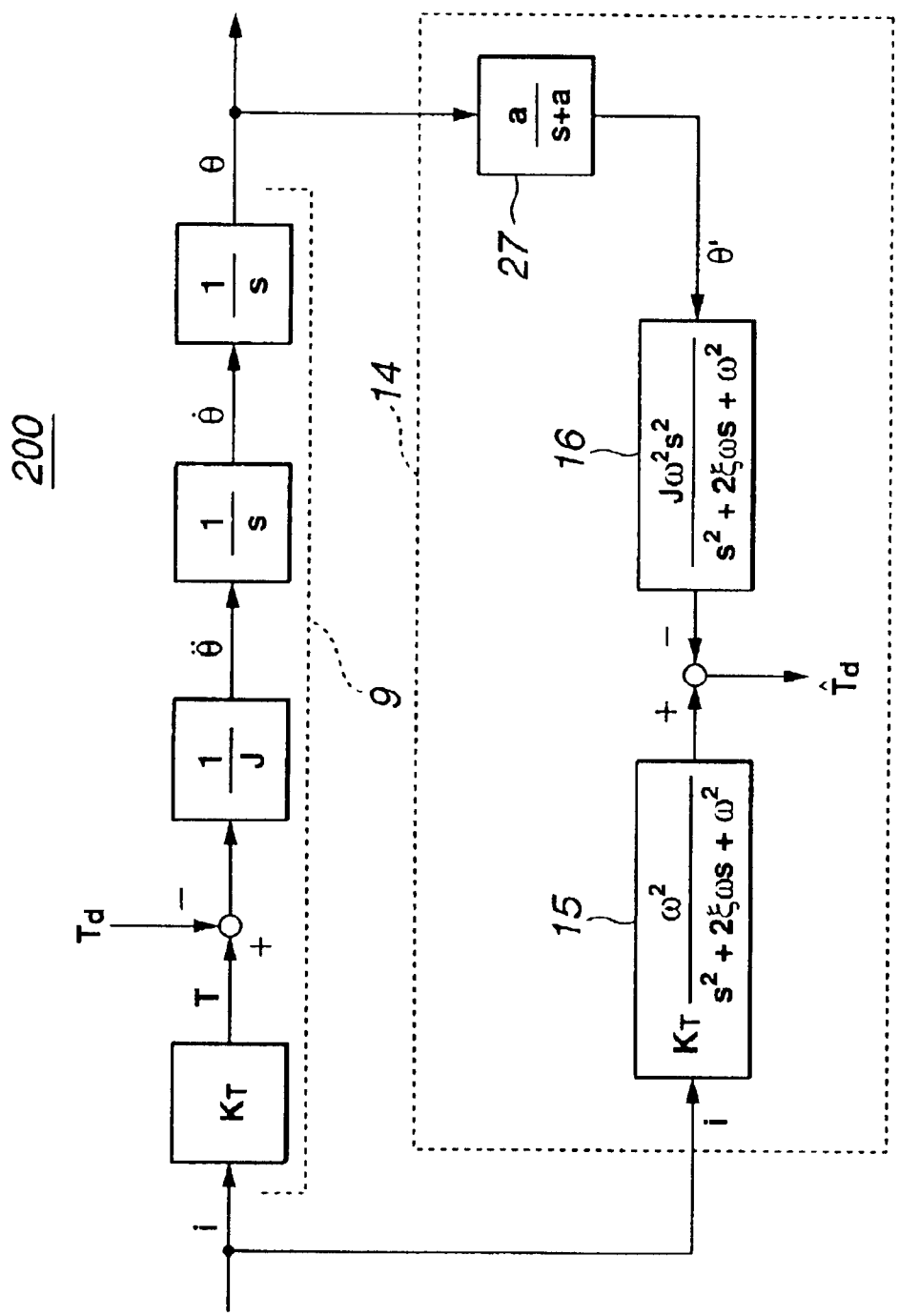
FIG. 5 is a view similar to FIG. 4, but showing the concept of a second embodiment of the present invention.

Referring to FIG. 5, there is schematically shown the concept of a second embodiment 200 of the present invention.

As shown in the drawing, the second embodiment 200 is substantially the same as the above-mentioned first embodiment 100 except that in the second embodiment 200, the information on rotation angle "θ" of the output shaft of steering motor 9 is 10 treated by a first order lag filter 27 before being led into second block 16 of road surface disturbance estimation section 14. That is, due to treatment by the filter 27, information signal "θ" is changed to an information signal "θ'", as shown.

In the filter 27, equation "a/(s+a)" is employed wherein "a" is a filter constant.

Operation of the second embodiment 200 will be described.

In a very early period of the steering action made by the driver, steering motor 9 produces an information representing the rotation angle "θ". However, the behavior of the vehicle caused by the steering action occurs somewhat later, so that the vehicle steering control system of the above-mentioned first embodiment 100 may fail to calculate the steering reaction force based on the vehicle running condition and the result provided by road surface disturbance estimation section 14. Of course, in this case, satisfied information is not transmitted to the vehicle driver.

In case of the second embodiment 200, usage of first order lag filter 27 enables a delayed input of information on rotation angle "θ" into second block 16 of road surface disturbance estimation section 14. That is, in the second embodiment 200, in the early period of the steering action, the disturbance caused by the roughness of road surface is estimated relatively large. However, practically, the vehicle driver can feel a much actual steering reaction force, and thus, the steerability of the vehicle is improved.

Figure 6:
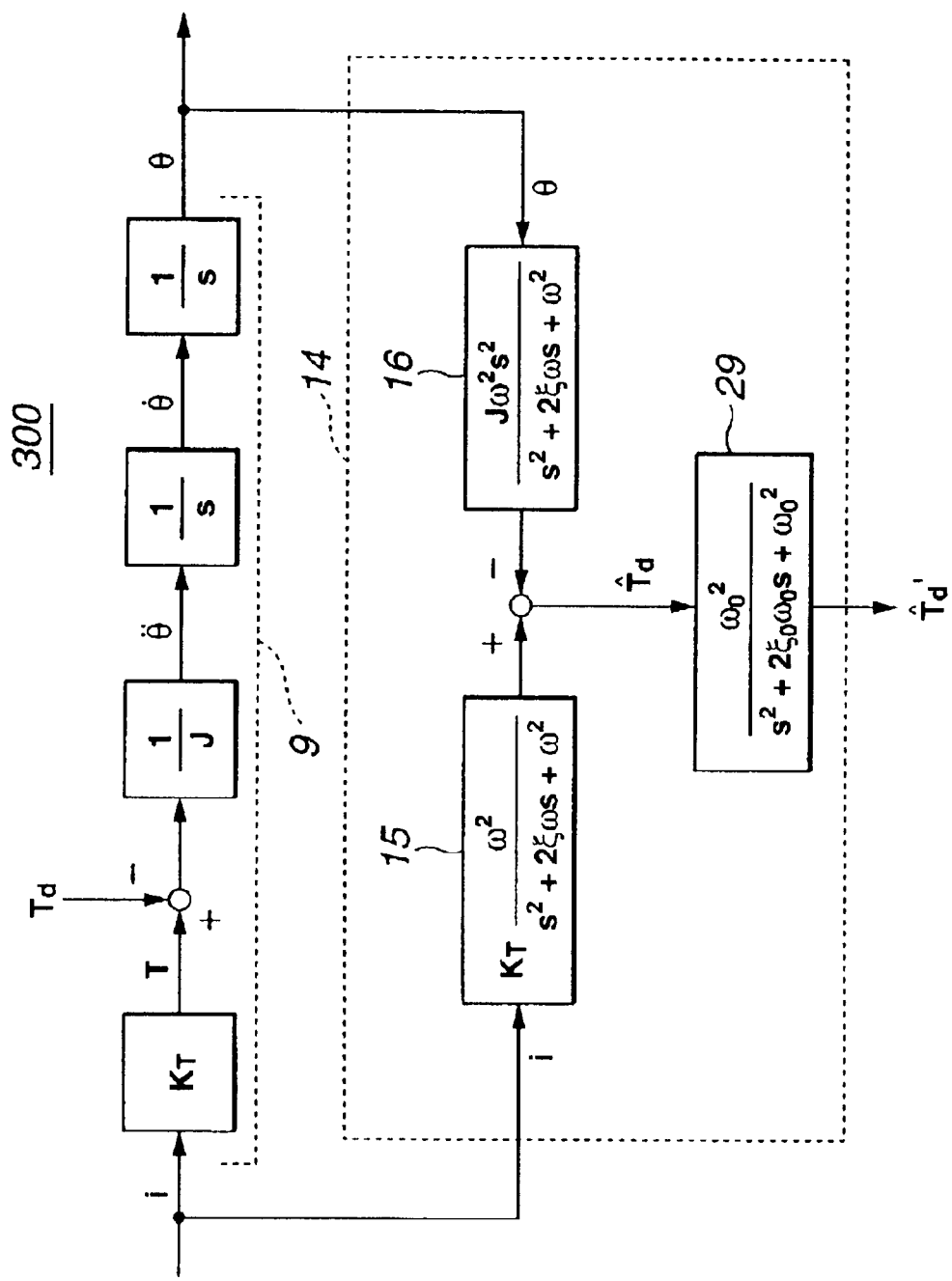
FIG. 6 is a view similar to FIG. 4, but showing the concept of a third embodiment of the present invention.

Referring to FIG. 6, there is schematically shown the concept of a third embodiment 300 of the present invention.

As shown in the drawing, the third embodiment 300 is substantially the same as the above-mentioned first embodiment 100 except that in the third embodiment 300, the estimated disturbance torque "T̂d" is treated by a second order lag filter 29 before being led into first steering reaction force calculating section 18 (see FIG. 1). That is, due to treatment by the filter 29, information "T̂d" is changed to an information "T̂d'", as shown.

By the filter 29, the following equation is employed to derive the information "T̂d'":

$$\hat{T}d' = \frac{\omega_0^2}{s^2 + 2\xi_0\omega_0 s + \omega_0^2} \quad (3)$$

In the third embodiment 300, by employing secondary filter 29, the frequency characteristic of the estimated disturbance torque can be suitably controlled. Specifically, in a high frequency zone, the gain of the estimated disturbance torque becomes small. Thus, when the vehicle steering control system 300 is practically used, an unnecessary marked vibration of a steering wheel, which would be generated when the vehicle is running on a bad road, is reduced. That is, the driver can receive only the information which is actually needed by the steering control.

The entire contents of Japanese Patent Application 2001-281362 filed Sep. 17, 2001 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A vehicle steering control system for use with a steering mechanism of steer-by-wire type, the steering mechanism including a first steering unit that is handed by a driver and a second steering unit that steers steered road wheels with the aid of a steering actuator, the first and second steering units being mechanically unconnected, the vehicle steering control system comprising:
   a steering reaction force actuator that generates a steering reaction force that is to be applied to the first steering unit in accordance with a steered movement of the steered road wheels;
   an input detecting section that detects an input applied to the steering actuator;
   an output detecting section that detects an output issued from the steering actuator;
   a road surface disturbance estimating section that estimates a disturbance of road surface based on both the detected input and output of the steering actuator;
   a steering reaction force calculating section that, based on the estimated disturbance of road surface, calculates a steering reaction force which is to be applied to the first steering unit; and
   a steering reaction force control section that instructs the steering reaction force actuator to generate a steering reaction force in accordance with the calculated steering reaction force.

2. A vehicle steering control system as claimed in claim 1, in which the steering reaction force calculating section comprises:
   a first steering reaction force calculating part that calculates a first steering reaction force based on the estimated disturbance of road surface;
   a second steering reaction force calculating part that calculates a second steering reaction force based on a behavior of an associated motor vehicle; and
   a third steering reaction force calculating part that, by subtracting the calculated first steering reaction force from the calculated second steering reaction force, calculates a final steering reaction force that is actually applied to the steering reaction force actuator.

3. A vehicle steering control system as claimed in claim 1, further comprising a filter through which a signal of the output from the output detecting section is led into the road surface disturbance estimating section.

4. A vehicle steering control system as claimed in claim 3, in which the filter is a first order lag filter.

5. A vehicle steering control system as claimed in claim 1, further comprising a filter through which a signal of the estimated disturbance of road surface from the road surface disturbance estimating section is led into the steering reaction force calculating section.

6. A vehicle steering control system as claimed in claim 5, in which the filter is a second order lag filter.

7. A vehicle steering control system as claimed in claim 1, in which the road surface disturbance estimating section comprises:
   a first block that processes the detected input to estimate a first torque in the form of transfer function;
   a second block that processes the detected output to estimate a second torque in the form of transfer function; and
   a calculating section that calculates a difference between the estimated first torque and the estimated second torque.

8. A vehicle steering control system for use with a steering mechanism of steer-by-wire type, the steering mechanism including a first steering unit that is handed by a driver and a second steering unit that steers steered road wheels with the aid of a steering actuator, the first and second steering units being mechanically unconnected, the vehicle steering control system comprising:
   a steering reaction force generating means that generates a steering reaction force that is to be applied to the first steering unit in accordance with a steered movement of the steered road wheels;
   an input detecting means that detects an input applied to the steering actuator;
   an output detecting means that detects an output issued from the steering actuator;
   a road surface disturbance estimating means that estimates a disturbance of road surface based on both the detected input and output of the steering actuator;
   a steering reaction force calculating means that, based on the estimated disturbance of road surface, calculates a steering reaction force which is to be applied to the first steering unit; and
   a steering reaction force control means that instructs the steering reaction force actuator to generate a steering reaction force in accordance with the calculated steering reaction force.

9. In a vehicle steering control system for use with a steering mechanism of steer-by-wire type, the steering mechanism including a first steering unit that is handed by a driver and a second steering unit that steers steered road wheels without a direct aid of the first steering unit, a steering actuator that actuates the second steering unit and a steering reaction force actuator that applies a steering reaction force to the first steering unit in accordance with a steered movement of the steered road wheels, a method of controlling the vehicle steering control system comprising:
   detecting an input applied to the steering actuator;
   detecting an output issued from the steering actuator;
   estimating a disturbance of road surface based on both the detected input and output of the steering actuator;
   calculating, based on the estimated disturbance of road surface, a steering reaction force which is to be applied to the first steering unit; and
   instructing the steering reaction force actuator to generate a steering reaction force in accordance with the calculated steering reaction force.

* * * * *